(12) United States Patent
Hiebsch

(10) Patent No.: US 11,047,521 B2
(45) Date of Patent: Jun. 29, 2021

(54) ADJUSTABLE TORQUE HINGE ASSEMBLY FOR HEADRESTS

(71) Applicant: Safran Seats USA LLC, Gainesville, TX (US)

(72) Inventor: Rudolph Hiebsch, Gainesville, TX (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 16/329,279

(22) PCT Filed: Aug. 30, 2016

(86) PCT No.: PCT/US2016/049400
§ 371 (c)(1),
(2) Date: Feb. 28, 2019

(87) PCT Pub. No.: WO2018/044272
PCT Pub. Date: Mar. 8, 2018

(65) Prior Publication Data
US 2020/0182396 A1    Jun. 11, 2020

(51) Int. Cl.
*F16M 11/14* (2006.01)
*F16M 11/20* (2006.01)
*F16M 13/02* (2006.01)
*B64D 11/00* (2006.01)

(52) U.S. Cl.
CPC ......... *F16M 11/14* (2013.01); *F16M 11/2078* (2013.01); *F16M 13/02* (2013.01); *B64D 11/00152* (2014.12)

(58) Field of Classification Search
CPC ..... F16M 11/14; F16M 11/2078; F16M 13/02
See application file for complete search history.

(56) References Cited

U.S. PATENT DOCUMENTS

| 5,529,265 | A  | 6/1996 | Sakurai |
| 7,040,697 | B1 | 5/2006 | Tuccinardi et al. |
| 2008/0185886 | A1 | 8/2008 | Li |
| 2011/0316311 | A1 | 12/2011 | Westerink et al. |

FOREIGN PATENT DOCUMENTS

| JP | 02210984 A * | 8/1990 |
| WO | 2016092509 | 6/2016 |

OTHER PUBLICATIONS

International Patent Application No. PCT/US2016/049400, International Search Report and Written Opinion, dated May 16, 2017.
Europe Patent Application No. 19198658.3, Extended Search Report, dated Jan. 22, 2020.

* cited by examiner

*Primary Examiner* — Anthony D Barfield
(74) *Attorney, Agent, or Firm* — Kilpatrick Townsend & Stockton LLP

(57) ABSTRACT

Described are headrests with a structural support surface and a torque hinge. The torque hinge includes a rotatable portion, a ball joint, and a plate assembly. The ball joint has a ball portion connected to a shaft. The ball portion is positioned within the rotatable portion, and the plate assembly is fitted over the shaft. The shaft is coupled to the structural support surface, and the plate assembly limits a rotational arc of the rotatable portion relative to the shaft.

14 Claims, 21 Drawing Sheets

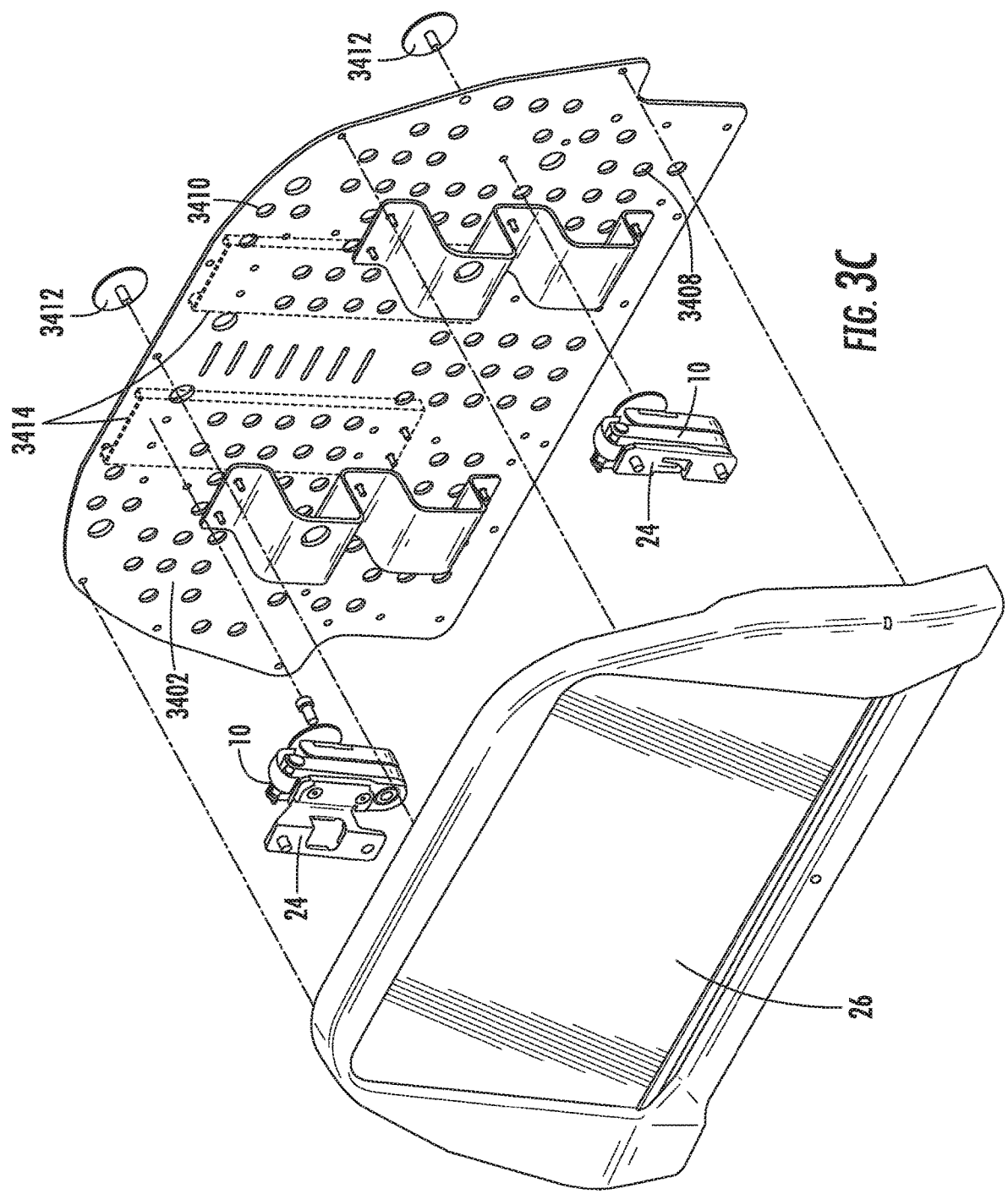

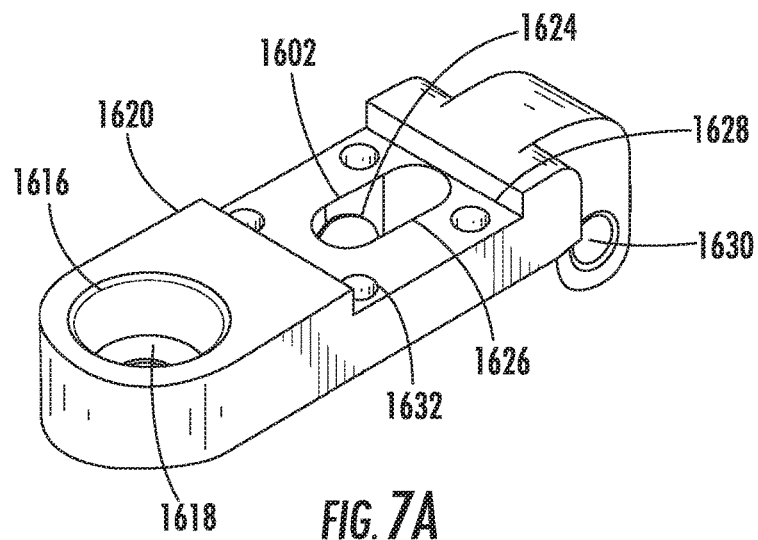
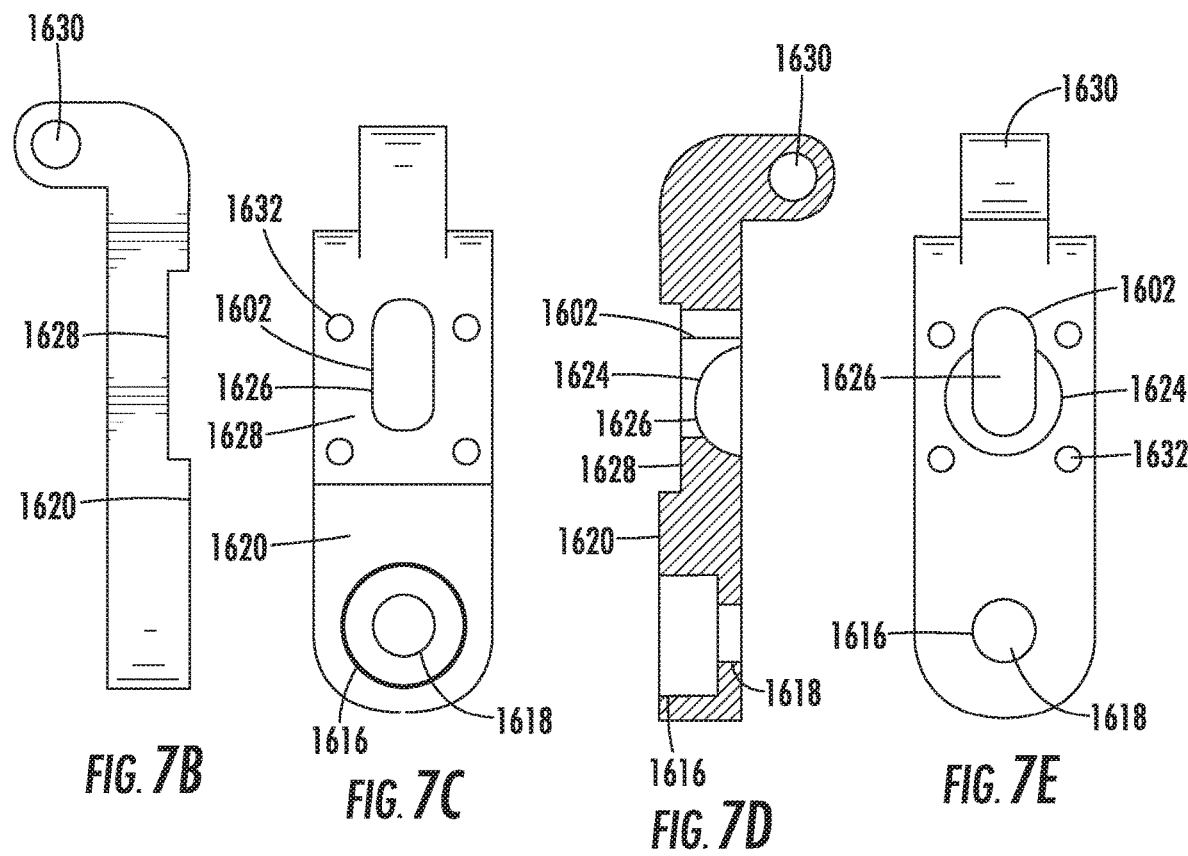

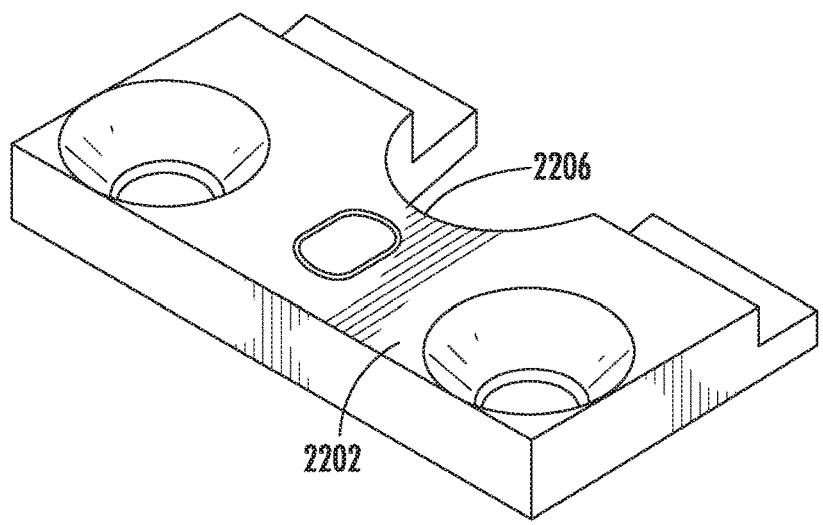
FIG. 10A
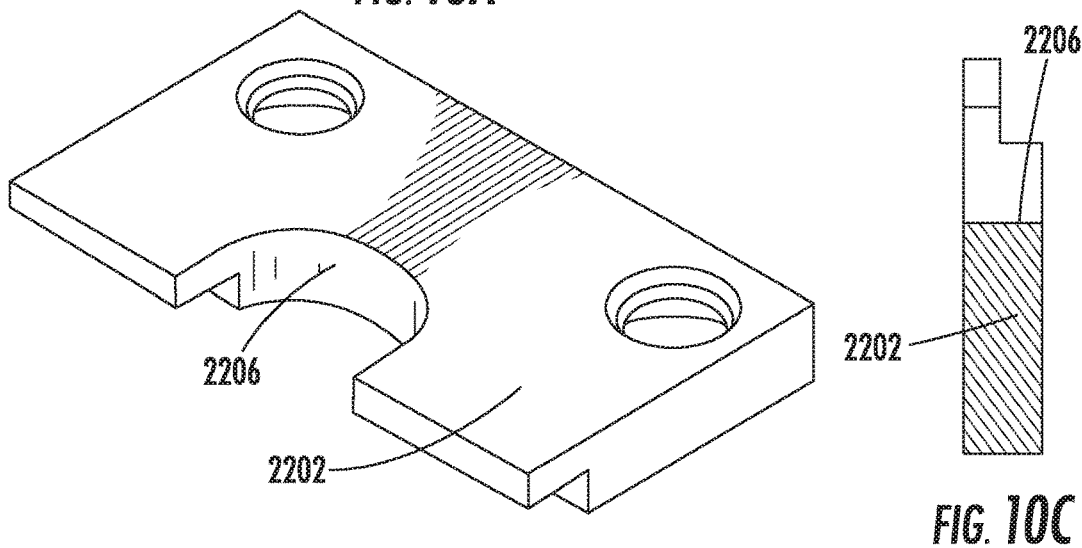
FIG. 10B
FIG. 10C
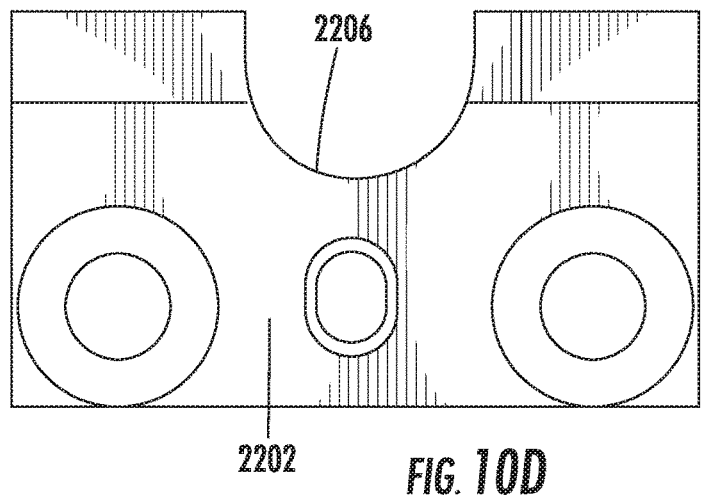
FIG. 10D

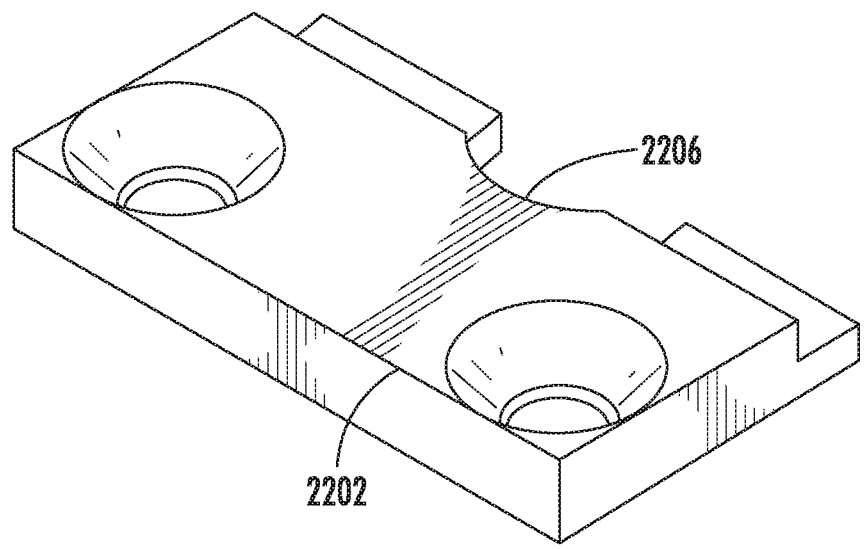
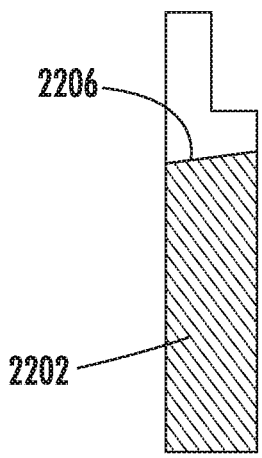
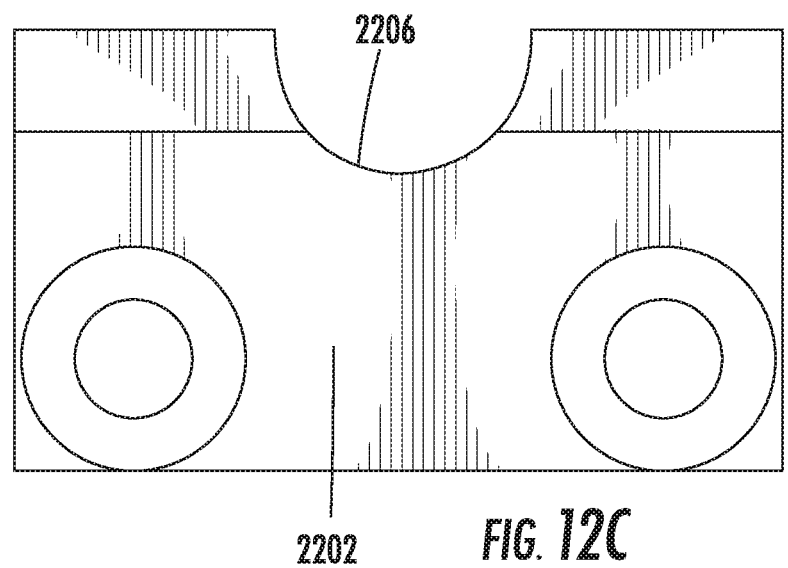

ADJUSTABLE TORQUE HINGE ASSEMBLY FOR HEADRESTS

FIELD OF THE INVENTION

The field of the invention relates to torque hinges, and more specifically, to torque hinges for use with display screens and personal electronic devices on aircraft and the like.

BACKGROUND

In many instances, passenger vehicles, such as aircraft, buses, trains, ships, and automobiles, include passenger seats with a wide assortment of personal electronic and entertainment options to encourage passengers to remain seated as much as possible during transport for safety, crew mobility, and to enable efficient cabin service. Some passenger seats may provide video and audio entertainment, including television, video games, internet access, and other on-board entertainment ("OBE") or in-flight entertainment ("IFE") components. Typically, these entertainment devices are mounted in the seat backs and arm rests of the passenger seats.

With the advent of personal electronics devices ("PEDs"), such as tablet computers, cell phones, smart phones, hand-held video game systems, personal digital assistants, palm-top computers, DVD players, data and audio-video media, multi-media enabled devices, and other similar electronic devices, many passengers prefer to use their own PEDs, rather than the OBE or IFE components that are mounted in the passenger seats.

These devices are typically mounted to the rear surface of the passenger seat using a video shroud or other structure to secure the device or mounting structure to the rear surface of the passenger seat. In many cases, a tray table is installed after the shroud is installed. As a result, installing or replacing a video display or mounting structure typically requires removal of the tray table and video shroud, which can be time-consuming and expensive.

Thus, it may be desirable to provide an alternative way to mount the devices to the rear side of the passenger seat that requires less invasive methods to service or replace the devices or mounting structures while still maintaining the functionality and freedom of positioning currently available.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a headrest comprises a structural support surface comprising a front side and a rear side, and a torque hinge. The torque hinge may comprise a lower hinge assembly comprising an articulating base, an upper hinge assembly comprising a shaft receptacle, and a ball joint comprising a ball portion connected to a shaft, wherein the ball portion is positioned between the articulating base and the shaft receptacle, and the shaft extends through an opening in the shaft receptacle. The shaft may be coupled to the rear side of the structural support surface by a fastener inserted from the front side of the structural support surface.

In some embodiments, the articulating base and the shaft receptacle are coupled to one another by a connector comprising a stop screw.

The headrest may further comprise a plate assembly fitted over the shaft. In some embodiments, the shaft is coupled to the structural support surface, and the plate assembly limits a rotational arc of the lower hinge assembly and the upper hinge assembly relative to the shaft.

According the some embodiments, the plate assembly comprises a stowed position portion and a deployed position portion. The stowed position portion may comprise a recess contoured to position the lower hinge assembly and the upper hinge assembly at a stowed angle, and the stowed angle may range from −5 to +7 degrees relative to a neutral position in which the lower hinge assembly and the upper hinge assembly are positioned substantially perpendicular to the shaft.

The deployed position portion may comprise a recess contoured to position the lower hinge assembly and the upper hinge assembly at a deployed angle, and the deployed angle may range from 0 to +22 degrees relative to a neutral position in which the lower hinge assembly and the upper hinge assembly are positioned substantially perpendicular to the shaft.

According to certain embodiments of the present invention, a headrest comprises a structural support surface and a torque hinge. The torque hinge comprises a rotatable portion, a ball joint, and a plate assembly. The ball joint comprises a ball portion connected to a shaft, wherein the ball portion is positioned within the rotatable portion, and the plate assembly is fitted over the shaft. The shaft is coupled to the structural support surface, and the plate assembly limits a rotational arc of the rotatable portion relative to the shaft.

In some embodiments, the rotatable portion comprises a lower hinge assembly comprising an articulating base and an upper hinge assembly comprising a shaft receptacle. The ball portion may be positioned between the articulating base and the shaft receptacle. The articulating base and the shaft receptacle may be coupled to one another by a connector comprising a stop screw.

In certain embodiments, the plate assembly comprises a stowed position portion and a deployed position portion. The stowed position portion may comprise a recess contoured to position the rotatable portion at a stowed angle, and the stowed angle may range from −5 to +7 degrees relative to a neutral position in which the rotatable portion is positioned substantially perpendicular to the shaft.

The deployed position portion may comprise a recess contoured to position the rotatable portion at a deployed angle, and the deployed angle may range from 0 to +22 degrees relative to a neutral position in which the rotatable portion is positioned substantially perpendicular to the shaft.

According to certain embodiments of the present invention, a method of installing a torque hinge within a headrest, the torque hinge comprising a rotatable portion and a ball joint comprising a ball portion connected to a shaft, wherein the ball portion is positioned within the rotatable portion, comprises removing a cushioning portion from a front side of the headrest to expose a structural support surface of the headrest, positioning an open end of the shaft adjacent a rear side of the structural support surface of the headrest, and securing the shaft to the rear side of the structural support surface of the headrest with a fastener inserted from the front side of the structural support surface of the headrest.

In some embodiments, the rotatable portion comprises a lower hinge assembly comprising an articulating base and an upper hinge assembly comprising a shaft receptacle, wherein the ball portion is positioned between the articulating base and the shaft receptacle, and the method further comprises tightening a connection between the lower hinge assembly and the upper hinge assembly to exert additional pressure on the ball portion.

BRIEF DESCRIPTION OF THE DRAWINGS

FIGS. 3A-3C are front (assembled and exploded) and rear exploded views of a structural support surface of the headrest of FIGS. 1 and 2 showing a torque hinge mounted thereto, according to certain embodiments of the present invention.

FIGS. 7A-7E are perspective and orthogonal views of certain embodiments of an upper hinge assembly of the torque hinge of FIGS. 4A and 4B.

FIGS. 10A-10D are perspective and orthogonal views of certain embodiments of a stowed position portion of a plate assembly of the torque hinge of FIGS. 4A and 4B.

FIGS. 12A-12C are perspective and orthogonal views of certain embodiments of a stowed position portion of a plate assembly of the torque hinge of FIGS. 4A and 4B.

DETAILED DESCRIPTION

Figure 1:
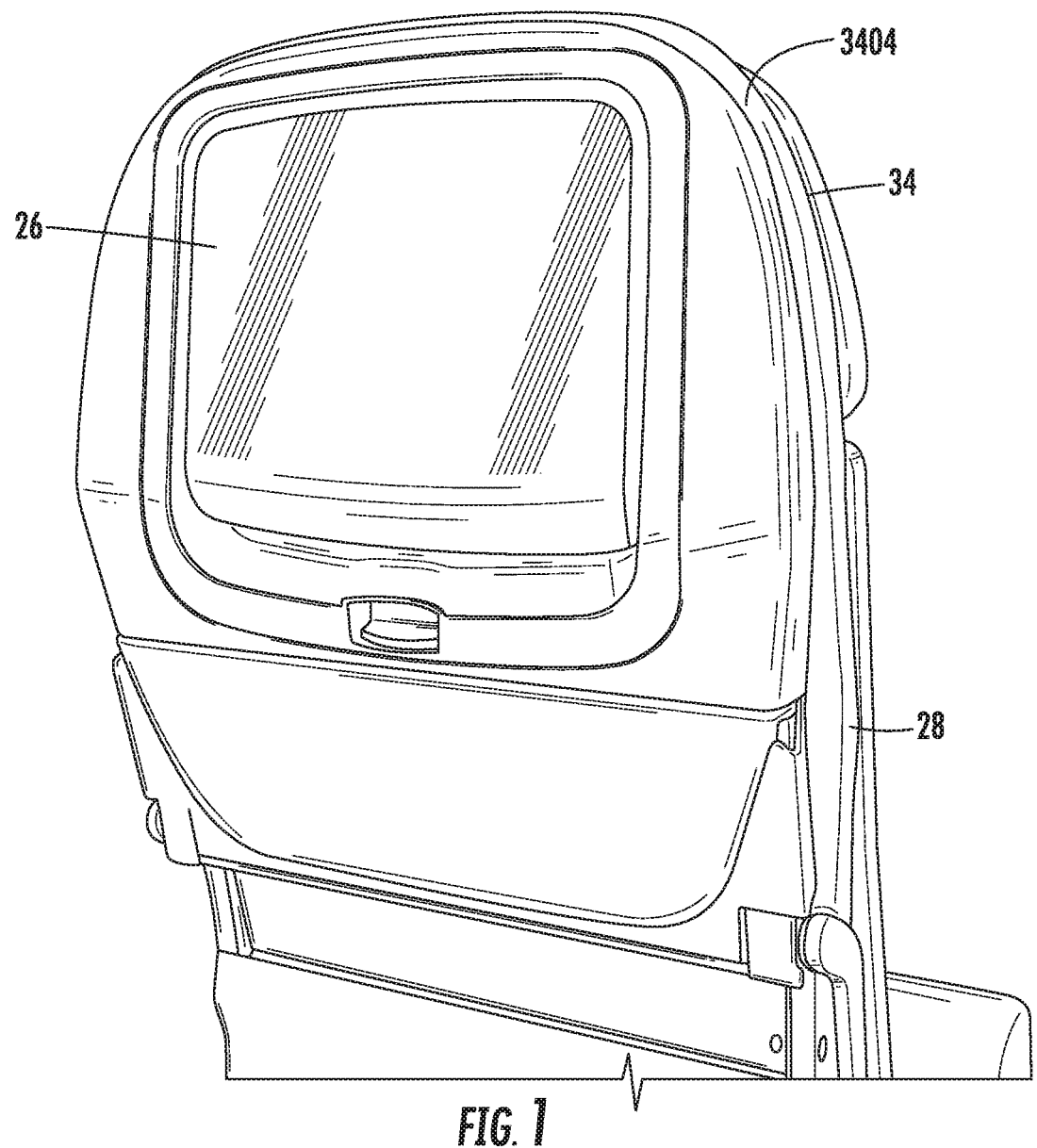
FIG. 1 is a perspective view of a passenger seat with a video display screen mounted to a rear side of a headrest, according to certain embodiments of the present invention.
Figure 2:
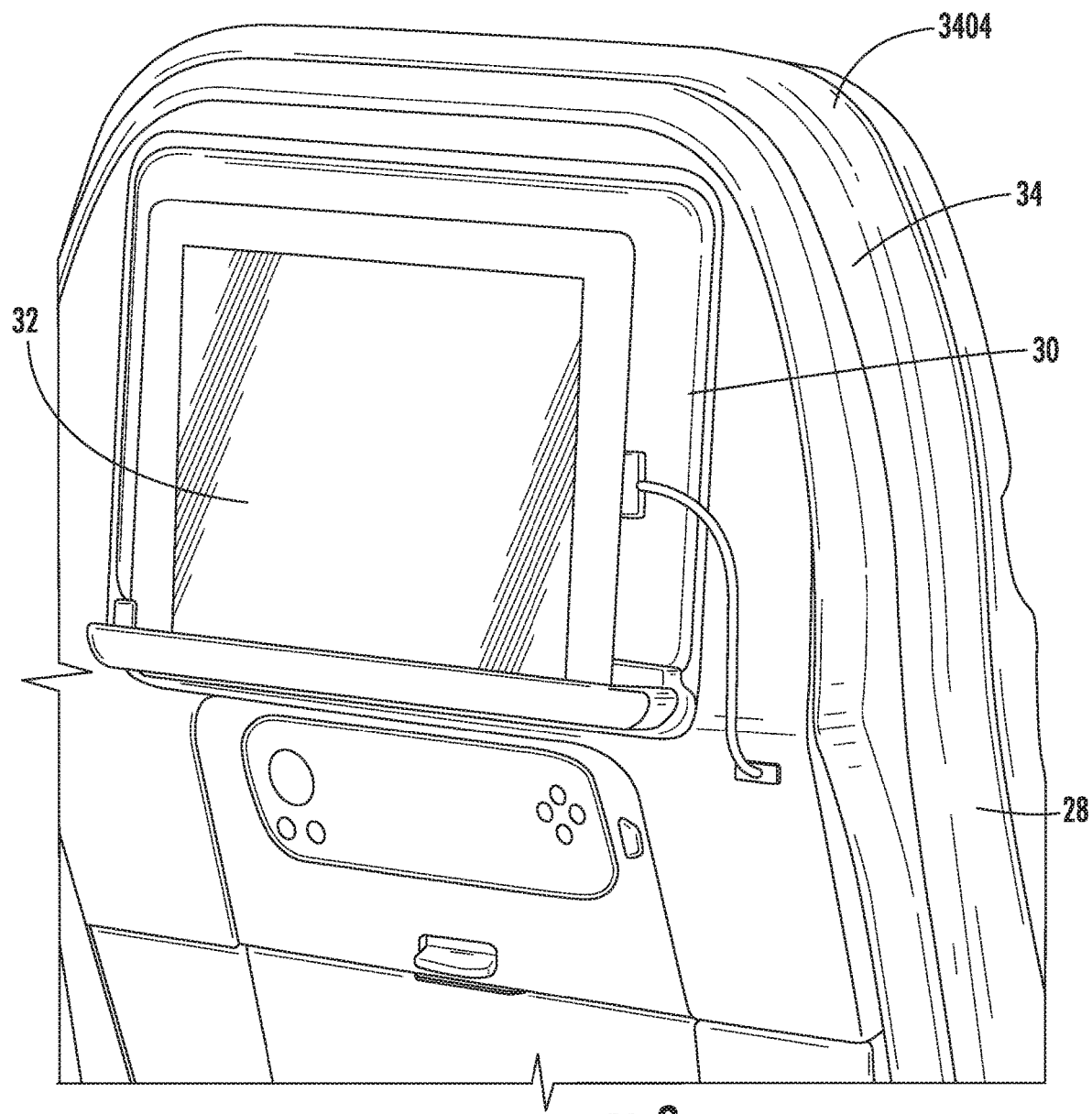
FIG. 2 is a perspective view of a passenger seat with a mounting device for a personal electronic device or other item, according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide fully adjustable torque hinges for use with displays and personal electronic devices. While the torque hinges are discussed for use with aircraft seats, they are by no means so limited. Rather, embodiments of the torque hinges may be used in passenger seats or other seats of any type or otherwise as desired.

According to certain embodiments of the present invention, as shown in FIGS. 1-3B, a torque hinge 10 may be used to couple an object, such as a video display screen 26 or mounting device 30 for personal electronic devices 32 or other items, to rear side of a passenger seat 28.

Torque Hinge Components and Assembly

As best illustrated in FIGS. 4A-15B, the torque hinge 10 may comprise a ball joint 12, a lower hinge assembly 14, and a upper hinge assembly 16.

Figure 5A:
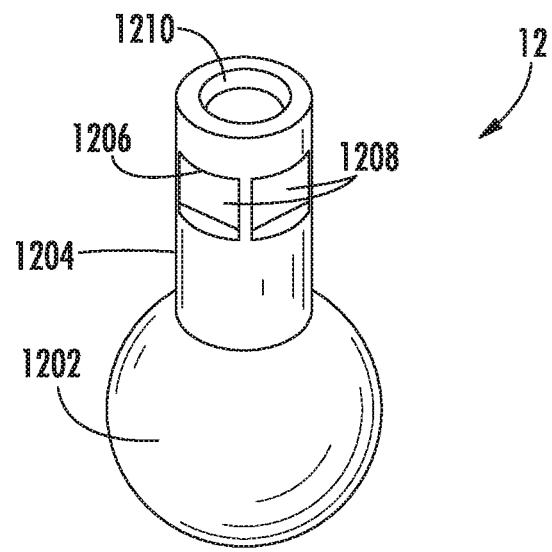
FIGS. 5A-5C are perspective and orthogonal views of certain embodiments of a ball joint of the torque hinge of FIGS. 4A and 4B.
Figure 5B:
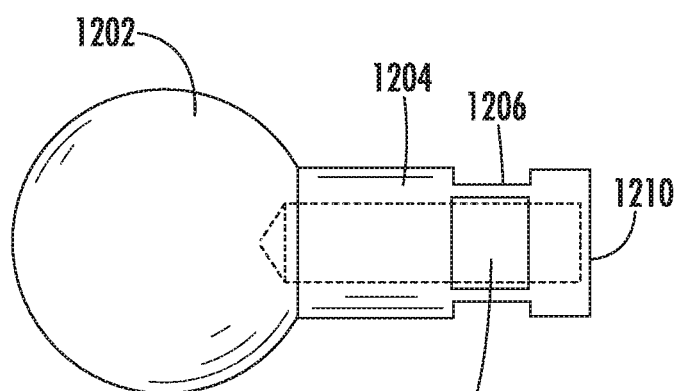
Figure 5C:
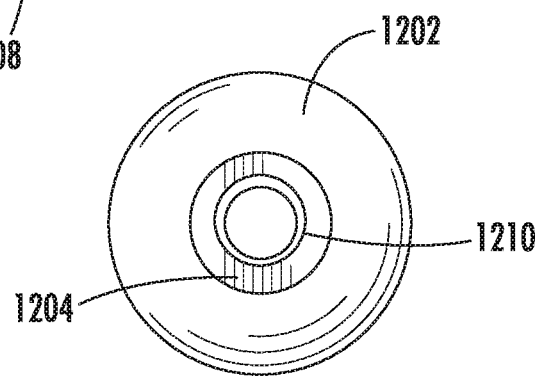
Figure 6A:
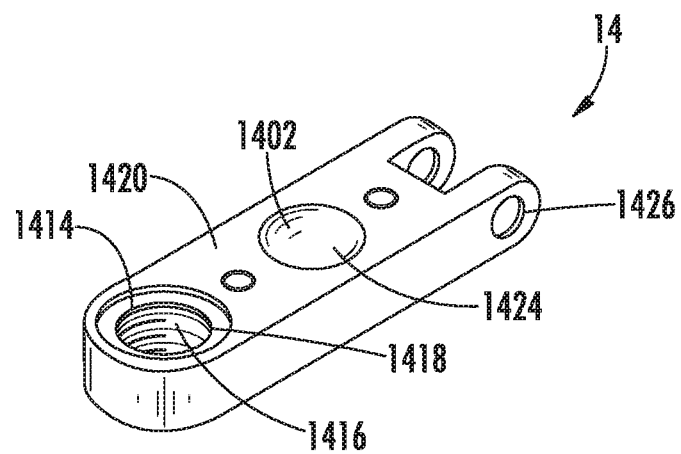
FIGS. 6A-6I are perspective and orthogonal views of certain embodiments of a lower hinge assembly of the torque hinge of FIGS. 4A and 4B.
Figure 6B:
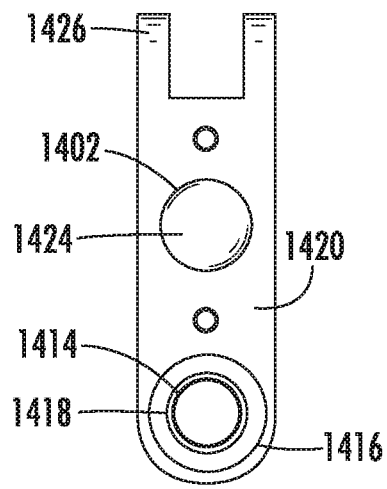
Figure 6C:
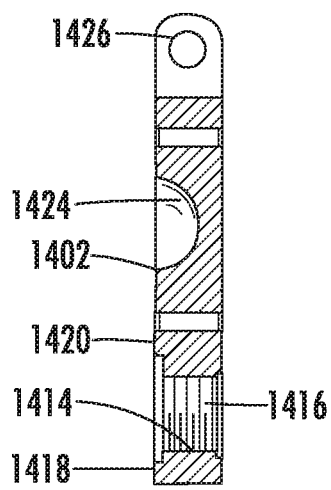
Figure 6D:
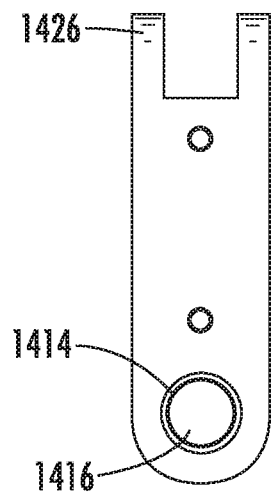
Figure 6E:
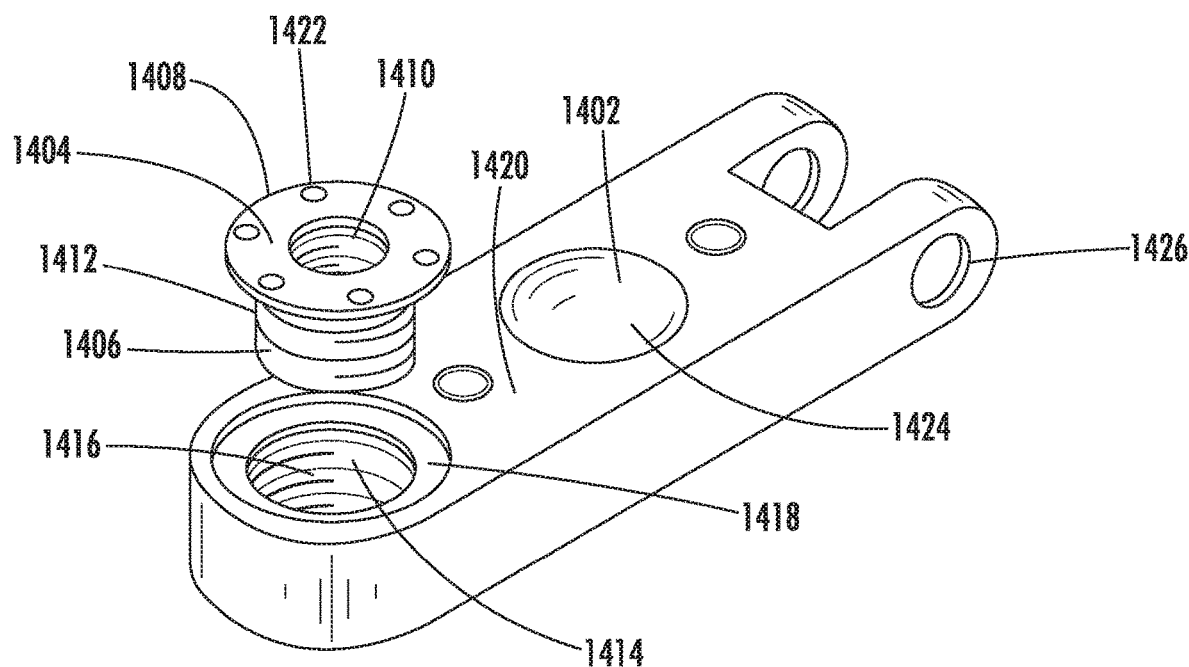
Figure 6F:
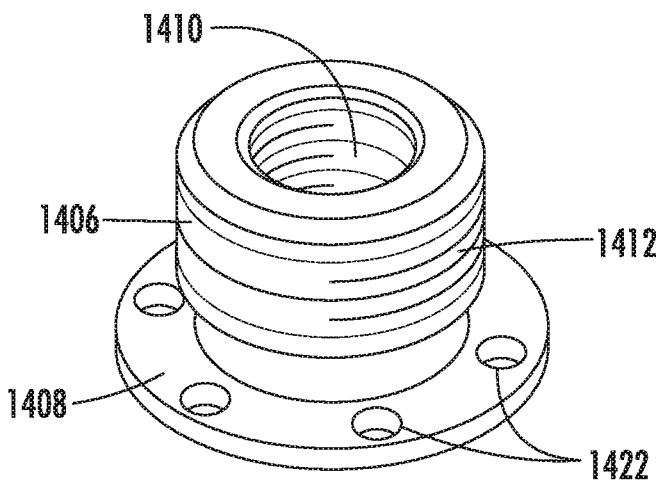
Figure 6G:
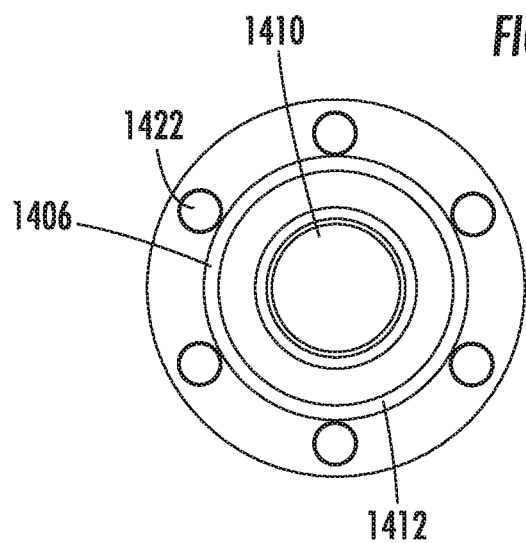
Figure 6H:
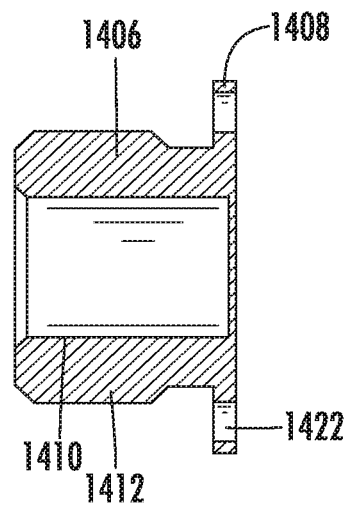
Figure 6I:
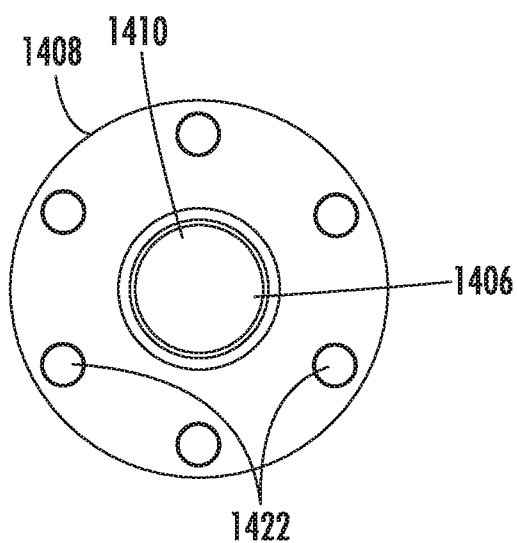
Figure 8A:
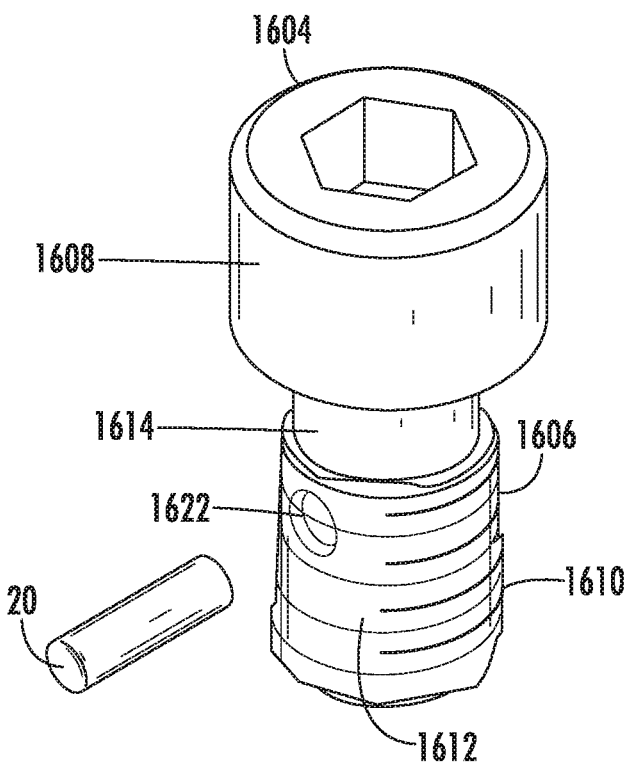
FIGS. 8A-8C are perspective and orthogonal views of certain embodiments of a connector of the torque hinge of FIGS. 4A and 4B.
Figure 8B:
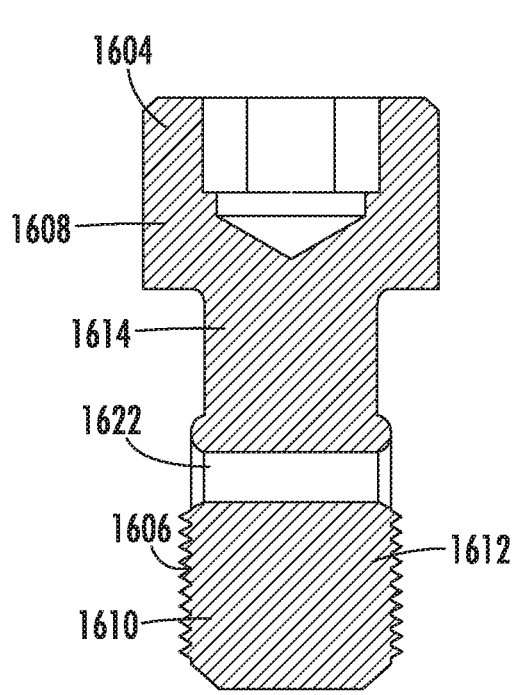
Figure 8C:
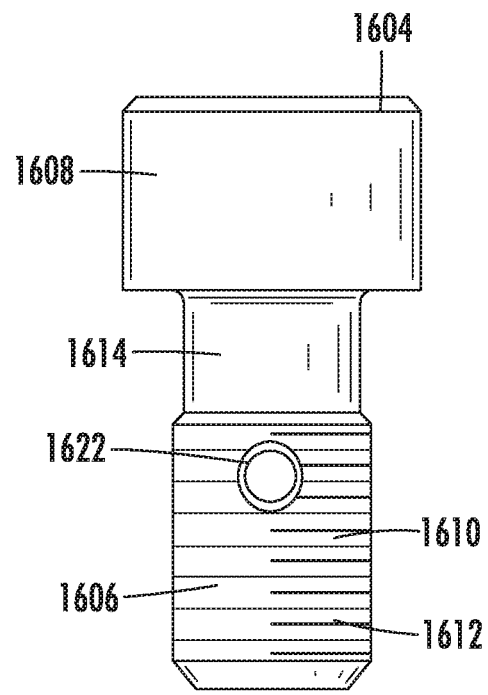
Figure 9A:
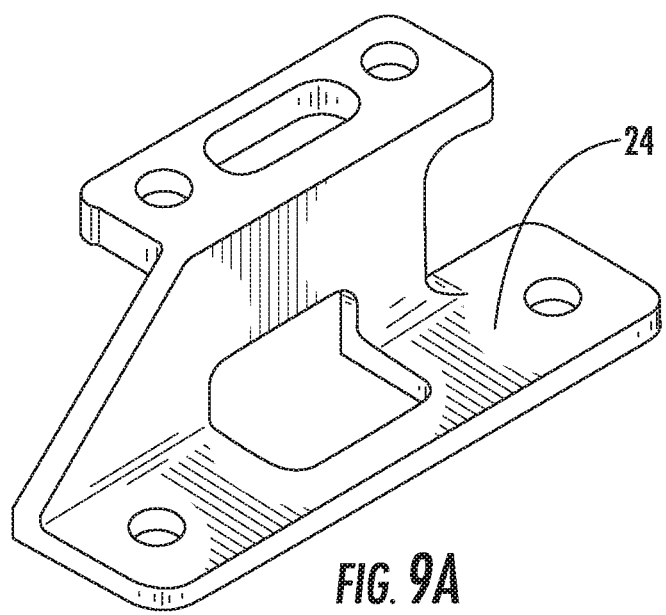
FIGS. 9A-9D are perspective and orthogonal views of certain embodiments of a mounting bracket of the torque hinge of FIGS. 4A and 4B.
Figure 9B:
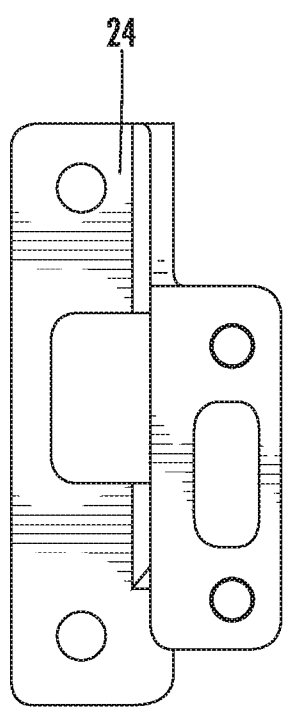
Figure 9C:
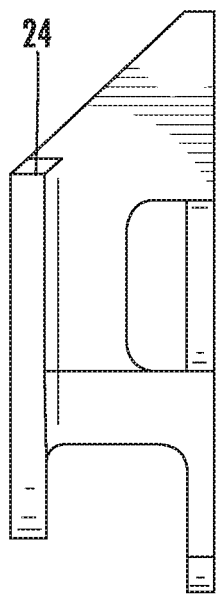
Figure 9D:
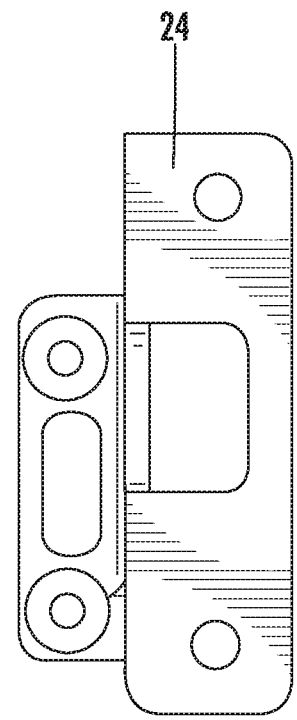

In certain embodiments, as shown in FIGS. 5A-5C, the ball joint 12 comprises a ball portion 1202 and a shaft 1204. In certain embodiments, the ball joint 12 may be integrally formed as a single piece. In other embodiments, the ball portion 1202 may be attached to the shaft 1204 through any suitable fastening design including but not limited to threaded connection, welding, adhesives, etc. The ball joint 12 may be formed of any suitable material have a stuffiest hardness to withstand repeated use and pressure without bending or breaking. For example, suitable materials may have a hardness of at least 40-50 Shore A hardness. Suitable materials include but are not limited to aluminum, magnesium, stainless steel, titanium, carbon-fiber, composites, plastics, etc.

The ball portion 1202 may have a diameter of at least 0.49-0.50 inches, although the diameter may be reduced by 0.06 inch or more, depending on the application and/or weight that will be supported by the torque hinge 10. The surface of the ball portion 1202 may be polished to approximately a mirror finish to minimize articulating friction as much as possible.

The shaft 1204 may have a diameter of at least 0.245 inches, although the diameter may be reduced by 0.06 inches or more, depending on the application and/or weight that will be supported by the torque hinge 10.

The shaft 1204 may also include a notched section 1206. The notched section 1206 may include at least two planar regions 1208, and may include up to eight planar regions 1208, around the circumference of the shaft 1204. The notched section 1206 may be included to provide a location to more easily grip the shaft 1204 with a tool, although such a section is not required.

As best illustrated in FIGS. 6A-6I, the lower hinge assembly 14 may comprise an articulating base 1402 and a connector receptacle 1404. In certain embodiments, the lower hinge assembly 14 is integrally formed as a single piece. In other embodiments, the connector receptacle 1404 and/or the articulating base 1402 may be attached to the lower hinge assembly 14 through any suitable fastening design including but not limited to threaded connection, welding, adhesives, etc. The lower hinge assembly 14 may be formed of any suitable material have a stuffiest hardness to withstand repeated use and pressure without bending or breaking. For example, suitable materials may have a hardness of at least 40-50 Shore A hardness. Suitable materials include but are not limited to aluminum, magnesium, stainless steel, titanium, carbon-fiber, composites, plastics, etc.

The connector receptacle 1404 may comprise a hollow cylindrical body 1406 having a flange 1408 attached to one end thereof. The inner diameter of the cylindrical body 1406 may range from 0.22-0.25 inches, and an inner surface 1410 of the cylindrical body 1406 may have a threaded texture to adjustably couple with a corresponding threaded outer surface 1612 of a connector 1604, as described in more detail below.

The outer diameter of the cylindrical body 1406 may range from 0.375-0.50 inches, and an outer surface 1412 of the cylindrical body 1406 may have a threaded texture that is configured to adjustably couple with a corresponding threaded surface 1414 of an aperture 1416 within the lower hinge assembly 14.

The aperture 1416 may also include a recessed region 1418 surrounding the aperture 1416 opening on one end. The recessed region 1418 may be shaped to correspond to the diameter and thickness of the flange 1408 so that the flange 1408 is approximately flush with a surface 1420 of the lower hinge assembly 14 when the connector receptacle 1404 is connected to the aperture 1416. The flange 1408 may comprise a series of apertures 1422 around the circumference thereof, through which rivets, screws, or other fasteners may be inserted to couple the connector receptacle 1404 to the aperture 1416.

The articulating base 1402 may comprise a rounded surface 1424, wherein the surface 1424 has an arcuate shape that closely corresponds to a portion of the surface shape of the ball portion 1202 of the ball joint 12. For example, the surface 1424 may have an arc that corresponds to a diameter of at least 0.49-0.50 inches, although the diameter may be reduced by 0.06 inches or more, depending on the application and/or weight that will be supported by the torque hinge 10. The surface 1424 may be polished to approximately a mirror finish to minimize articulating friction as much as possible.

The lower hinge assembly 14 may further comprise a pivot hinge 1426. The pivot hinge 1426 may be positioned at an end of the lower hinge assembly 14 that opposes the location of the connector receptacle 1404.

As best illustrated in FIGS. 7A-7E and 8A-8C, the upper hinge assembly 16 may comprise a shaft receptacle 1602 and a connector 1604. In certain embodiments, the upper hinge assembly 16 is integrally formed as a single piece. In other embodiments, the shaft receptacle 1602 and/or the connector 1604 may be attached to the upper hinge assembly 16 through any suitable fastening design including but not limited to threaded connection, welding, adhesives, etc. The upper hinge assembly 16 may be formed of any suitable material have a stuffiest hardness to withstand repeated use and pressure without bending or breaking. For example, suitable materials may have a hardness of at least 40-50 Shore A hardness. Suitable materials include but are not limited to aluminum, magnesium, stainless steel, titanium, carbon-fiber, composites, plastics, etc.

The connector 1604 may comprise a cylindrical body 1606 having a flange 1608 attached to one end thereof. At least a lower portion 1610 of the cylindrical body 1606 may comprise a diameter ranging from 0.22-0.25 inches, and an outer surface 1612 of the lower portion 1610 of the cylindrical body 1606 is shaped to correspond to the shape and dimensions of the inner surface 1410 of the hollow cylindrical body 1406 of the connector receptacle 1404. As described above, the surfaces 1612, 1410 may be configured with a threaded texture for a releasable connection therebetween.

The flange 1608 and an upper portion 1614 of the cylindrical body 1606 are designed to be positioned within an aperture 1616 in the upper hinge assembly 16. The aperture 1616 may include a recessed region 1618 surrounding the aperture 1616 opening on one end. The recessed region 1618 may be shaped to correspond to the diameter and thickness of the flange 1608 so that the flange 1608 is approximately flush with a surface 1620 of the upper hinge assembly 16 when the connector 1604 is inserted into the aperture 1616. A stop screw receptacle 1622 may be positioned through the cylindrical body 1606, and may be located between the lower portion 1610 and the upper portion 1614.

The shaft receptacle 1602 may comprise a rounded surface 1624, wherein the surface 1624 has an arcuate shape that closely corresponds to a portion of the surface shape of the ball portion 1202 of the ball joint 12. For example, the surface 1624 may have an arc that corresponds to a diameter of at least 0.49-0.50 inches, although the diameter may be reduced by 0.06 inches or more, depending on the application and/or weight that will be supported by the torque hinge 10. The surface 1624 may be polished to approximately a mirror finish to minimize articulating friction as much as possible.

The shaft receptacle 1602 may further comprise an opening 1626 through which the shaft 1204 extends when the ball portion 1202 is positioned adjacent the surface 1624. The portion of the surface 1620 surrounding the opening 1626 may form a recessed area 1628 and comprise apertures 1632, which are configured for attachment of a plate assembly 22, which is described in detail below. In some embodiments, the opening 1626 has an elongated slotted configured to allow the shaft 1204 to move about an arc of −5 degrees to +22 degrees.

The upper hinge assembly 16 may further comprise a pivot hinge 1630. The pivot hinge 1630 may be positioned at an end of the upper hinge assembly 16 that opposes the location of the connector 1604.

As best illustrated in FIGS. 4A-4B and 15A-15B, the ball joint 12, lower hinge assembly 14, and upper hinge assembly 16 may be assembled by first positioning the ball portion 1202 of the ball joint 12 adjacent the articulating base 1402 of the lower hinge assembly 14. The shaft 1204 of the ball joint 12 is then extended through the opening 1626 in the upper hinge assembly 16, and the upper hinge assembly 16 is lowered until the ball portion 1202 is sandwiched between the articulating base 1402 and the spherically-shaped surface 1624 of the shaft receptacle 1602. In this position, the pivot hinges 1426 and 1630 are aligned with one another such that a pivot shaft 18 may be inserted through aligned apertures in the pivot hinges 1426, 1630. The pivot shaft 18 may be secured through any suitable fastener including but not limited to a cotter pin, threaded fastener, or other suitable means.

The connector 1604 is then inserted through the aperture 1616 in the upper hinge assembly 16. Once the stop screw receptacle 1622 has passed through the upper hinge assembly 16 and is accessible below the upper hinge assembly 16, a stop screw 20 is inserted therethrough to prevent overtightening the connector 1604 to the lower hinge assembly 14.

The connector 1604 is then fastened to the connector receptacle 1404. When the connector 1604 is loosely connected to the connector receptacle 1404, the two hinge assemblies 14, 16 place little to no pressure on the ball portion 1202 of the ball joint, thus allowing the ball portion 1202 to rotate freely between the surfaces 1424, 1624. As the connector 1604 is tightened against the connector receptacle 1404, the surfaces 1424, 1624 are pressed against one another, thereby exerting progressively increasing pressure on the ball portion 1202. The two surfaces 1424, 1624 are continually pressed toward each other until the stop screw 20 contacts the connector receptacle 1404, which in turn prevents further tightening and thus, prevent further increases in the pressure placed on the ball portion 1202.

Torque Hinge and Headrest Assembly and Maintenance

Figure 3A:
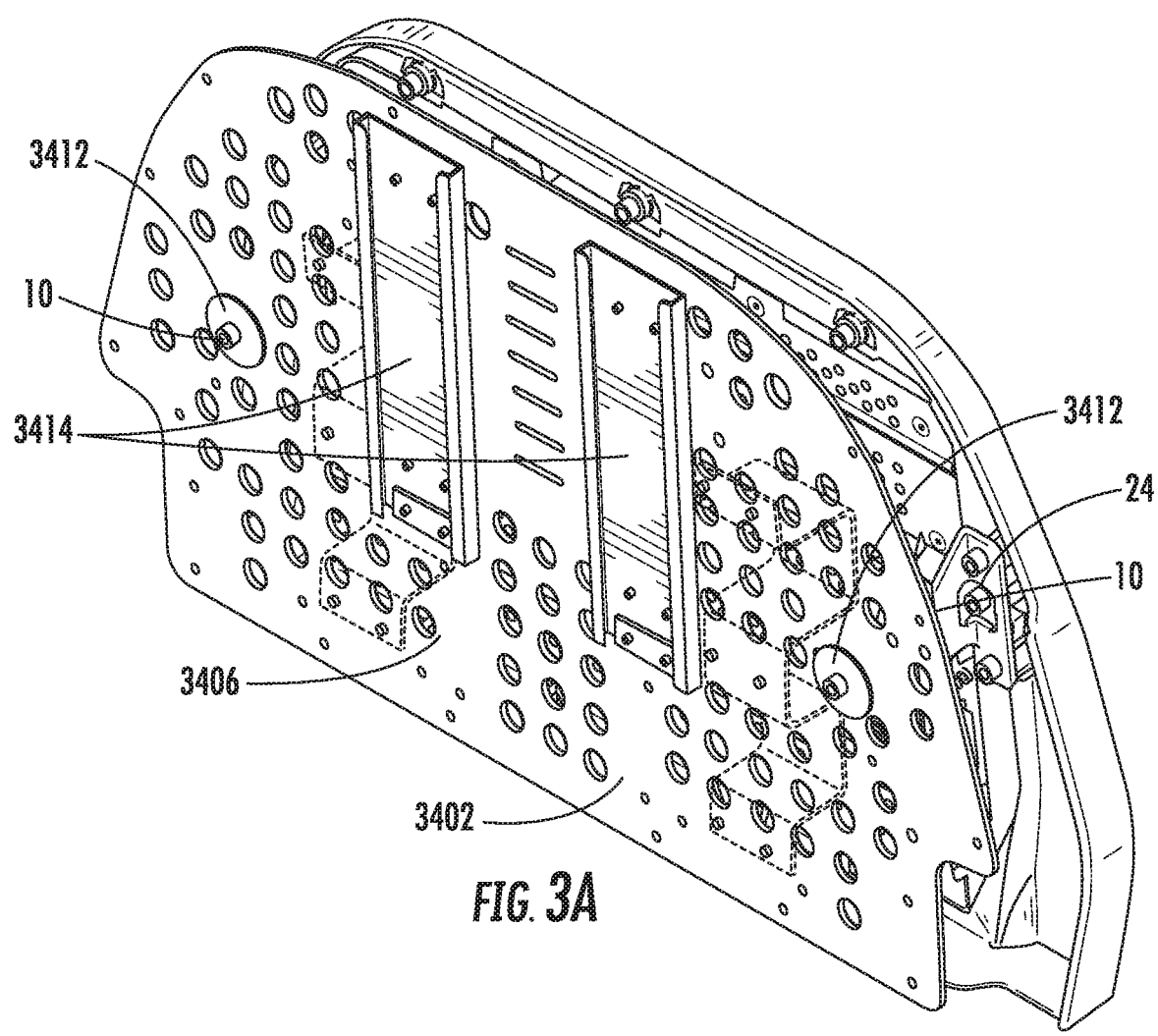
Figure 3B:
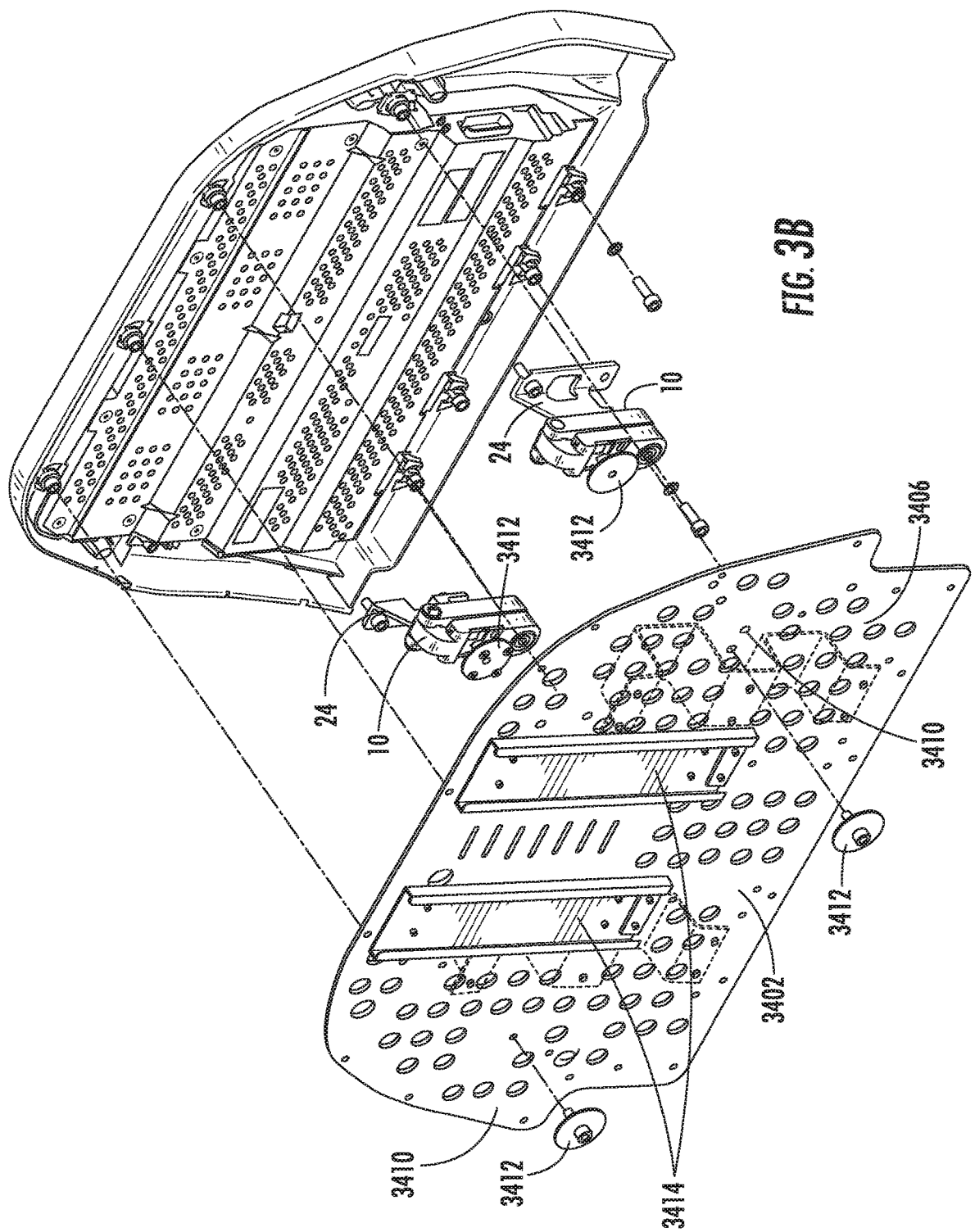
Figure 4A:
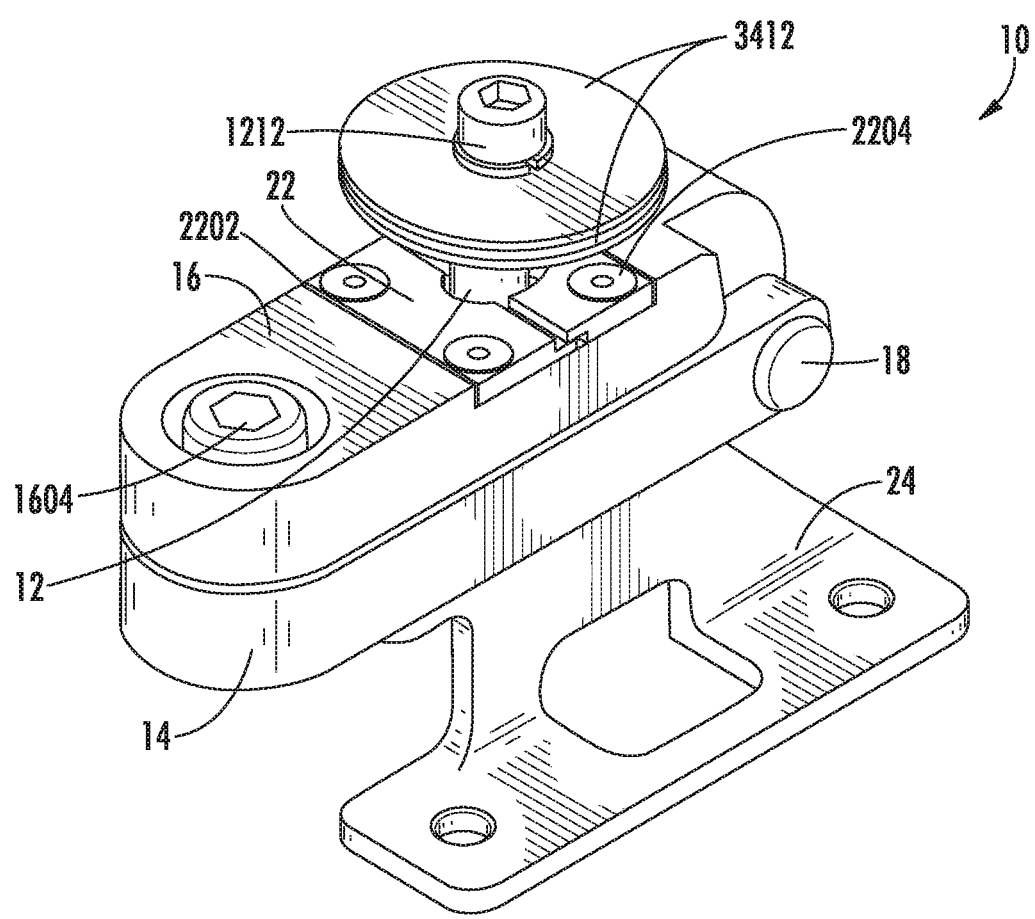
FIGS. 4A and 4B are assembled and exploded views, respectively, of a torque hinge, according to certain embodiments of the present invention.
Figure 4B:
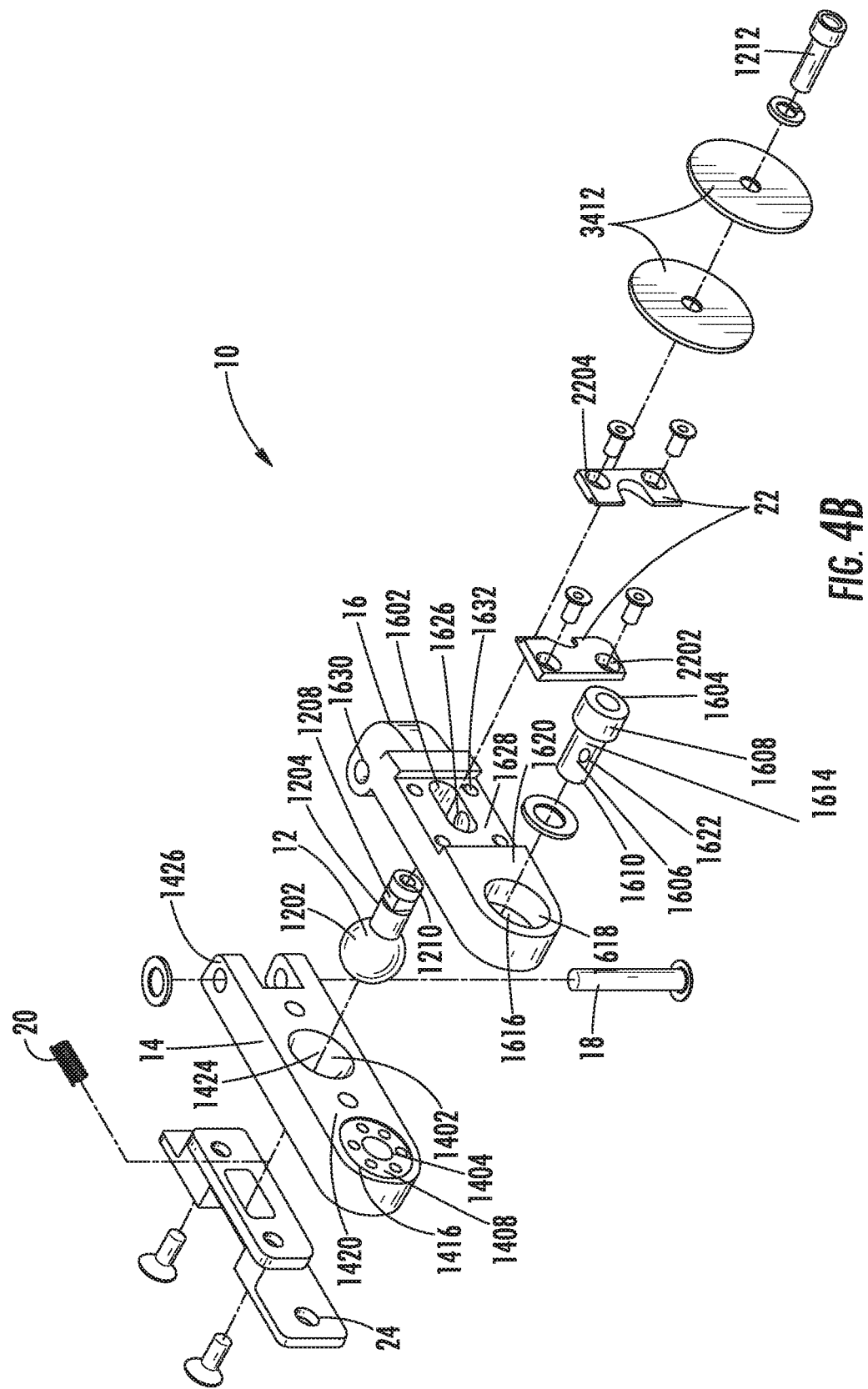

In these embodiments, the shaft 1204 of the ball joint 12 may be coupled to the headrest 34 of the passenger seat 28, as best illustrated in FIGS. 3A-3C. In particular, the headrest 34 may comprise a structural support surface 3402, in which a cushioning portion 3404 is attached to a front side 3406 of the surface 3402 via a pair of tracks 3414, and the torque hinge 10 is attached to a rear side 3408 of the surface 3402. For example, the shaft 1204 may comprise a threaded inner opening 1210, which is configured to couple to a compatible threaded fastener 1212. The threaded fastener 1212 is inserted through an aperture 3410 in the surface 3402 and is releasably attached to the threaded inner opening 1210 of the shaft 1204. The threaded fastener 1212 is inserted through the surface 3402 from the front side 3406, and the shaft 1204 is positioned adjacent the rear side 3408 of the surface 3402. Washers 3412 may be positioned on each side of the surface 3402 adjacent the aperture 3410 to stabilize the connection between the threaded fastener 1212 and the shaft 1204 and to prevent the shaft 1204 or the head of the fastener 1212 from passing through the surface 3402.

By attaching the torque hinge 10 to the headrest 34 from the front side 3406, accessing the fastener 1212 to disconnect the torque hinge 10 from the headrest 34 is much easier because the only steps required are removal of the cushioning portion 3404 of the headrest and disconnection of the fastener 1212 from the shaft 1204. Simplified access and disconnection means that the amount of time and effort required to exchange a video display screen 26 or other mounting devices 30 mounted to the rear side 3408 of the surface 3402 is greatly reduced.

Torque Hinge Rotational Control

The lower hinge assembly 14 may be coupled to a mounting bracket 24, which may in turn be connected to any suitable item that requires adjustable positioning including but not limited to video display screens 26, mounting devices 30 for personal electronic devices 32, and other similar items, as illustrated in FIGS. 1-3B. Once the shaft 1204 of the ball joint 12 is secured to the structural support surface 3402 via the fastener 1212 as described above, the remainder of the torque hinge 10 (including the mounting bracket 24 and any objects mounted thereto) rotates around the ball portion 1202 in an arc that is controlled by the shape of the opening 1626 and by a shape of the plate assembly 22, which is positioned adjacent the opening 1626.

As best illustrated in FIGS. 4A-4B, 10A-10D, 11A-11C, 12A-12C, 13A-13D, 14A-14C, and 15A-15B, the plate assembly 22 is positioned around the portion of the shaft 1204 that extends through the opening 1626 in the upper hinge assembly 16. The plate assembly 22 may be releasably attached to the apertures 1632 in the recessed area 1628 of the upper hinge assembly 16 via any suitable releasable fastening mechanism including but not limited to screws, bolts, etc.

The plate assembly 22 may be adjusted to provide different ranges of movement, depending on the shape and type of devices to be adjusted. For example, the plate assembly 22 may comprise a stowed position portion 2202 and a deployed position portion 2204.

The stowed position portion 2202 controls the stowed position of the rotatable portion of the torque hinge 10. The shaft 1204 encounters the stowed position portion 2202 as the rotatable portion of the torque hinge 10 is rotated toward the headrest 34. The stowed position portion 2202 then stops further movement of the rotatable portion of the torque hinge 10 in that direction. The shape of a recess 2206 in the stowed position portion 2202 is contoured to position the rotatable portion of the torque hinge 10 at the desired stowed angle.

For example, FIGS. 10A-10D illustrate a stowed position portion 2202 having a recess 2206 contoured with a 0 degree (or neutral) stowed angle position. In these embodiments, the rotatable portion of the torque hinge 10 is positioned substantially perpendicular to the shaft 1204 in the stowed position.

Figure 11A:
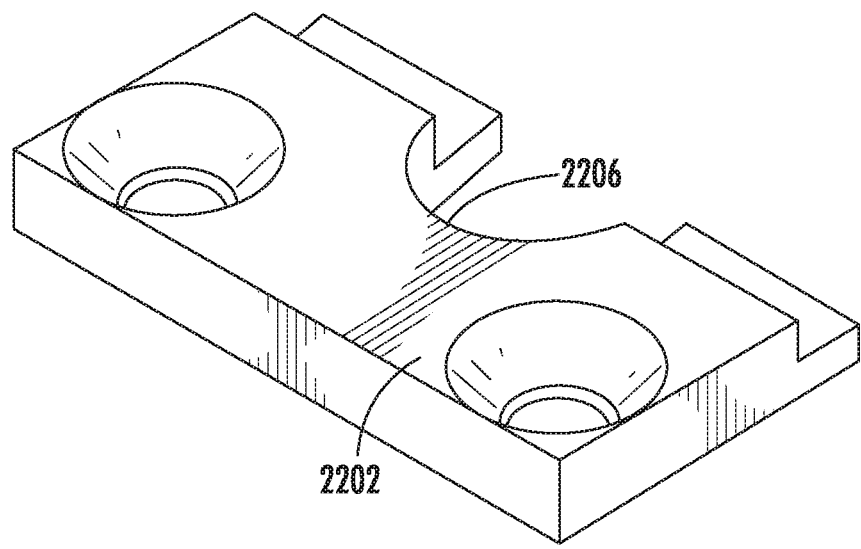
FIGS. 11A-11C are perspective and orthogonal views of certain embodiments of a stowed position portion of a plate assembly of the torque hinge of FIGS. 4A and 4B.
Figure 11B:
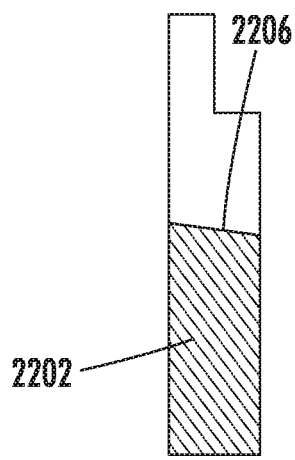
Figure 11C:
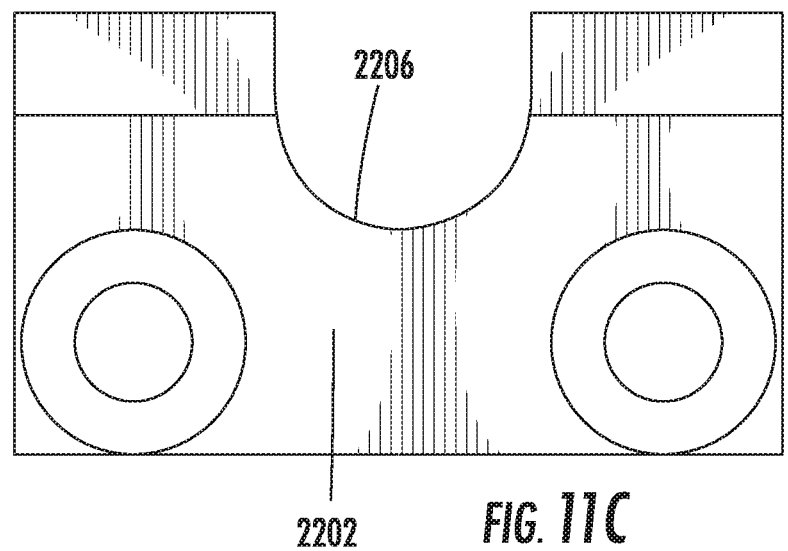
Figure 13A:
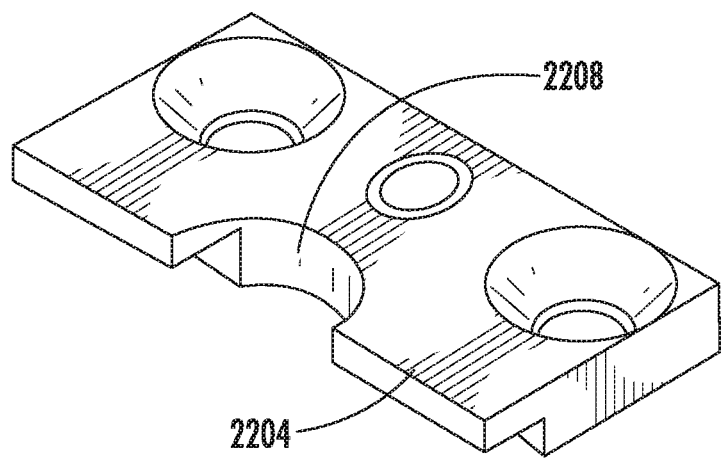
FIGS. 13A-13D are perspective and orthogonal views of certain embodiments of a deployed position portion of a plate assembly of the torque hinge of FIGS. 4A and 4B.
Figure 13B:
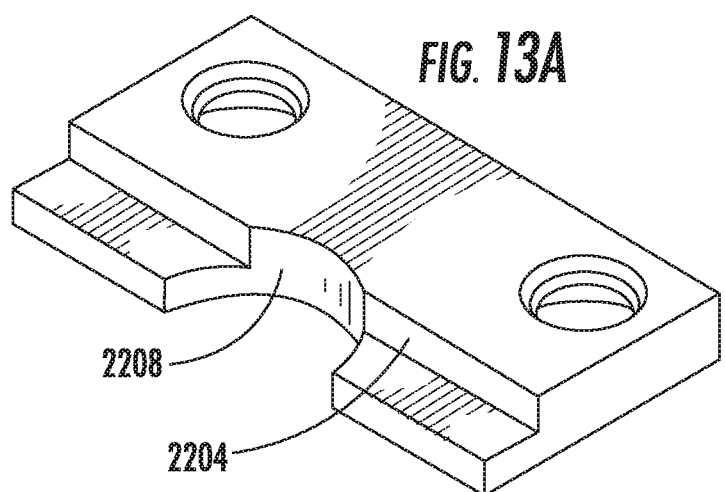
Figure 13C:
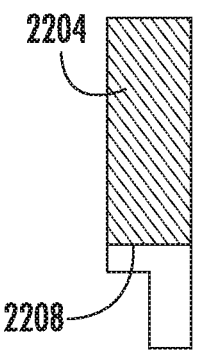
Figure 13D:
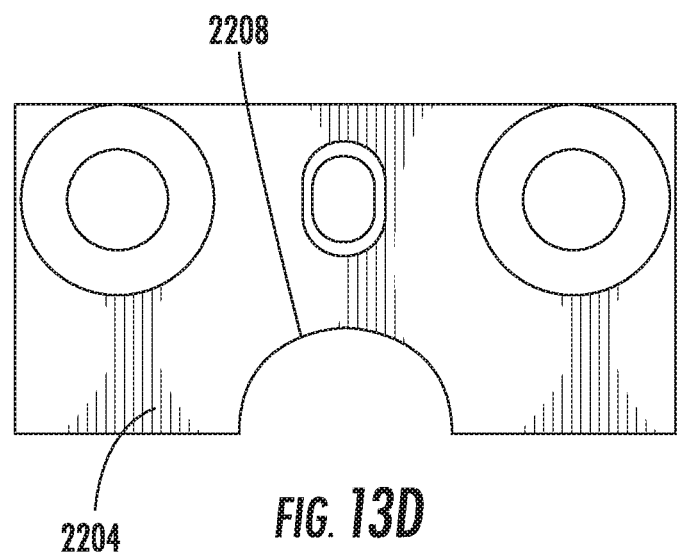

In other embodiments, FIGS. 11A-11C illustrate a stowed position portion 2202 having a recess 2206 contoured with a −5 degree stowed angle position. In these embodiments, the rotatable portion of the torque hinge 10 is angled toward the structural support surface 3402 by 5 degrees beyond the neutral positioned described with respect to FIGS. 10A-10D.

In further embodiments, FIGS. 12A-12C illustrate a stowed position portion 2202 having a recess 2206 contoured with a +7 degree stowed angle position. In these embodiments, the rotatable portion of the torque hinge 10 is angled away the structural support surface 3402 by 7 degrees short of the neutral positioned described with respect to FIGS. 10A-10D.

The person of ordinary skill in the relevant art will understand that these are but a few examples of shapes for stowed position portions 2202, and that any suitable angle may be used to achieve the desired stowed position, which provides a suitable stowed position within the headrest 34, including but not limited to any value within the −5 to +7 degree range, or any value outside of this range.

In contrast, the shape of a recess 2208 in the deployed position portion 2204 is contoured to position the rotatable portion of the torque hinge 10 at the desired deployed angle. For example, FIGS. 13A-13D illustrate a deployed position portion 2204 having a recess 2208 contoured with a 0 degree (or neutral) deployed angle position. In these embodiments, the rotatable portion of the torque hinge 10 is positioned substantially perpendicular to the shaft 1204 in the deployed position.

Figure 14A:
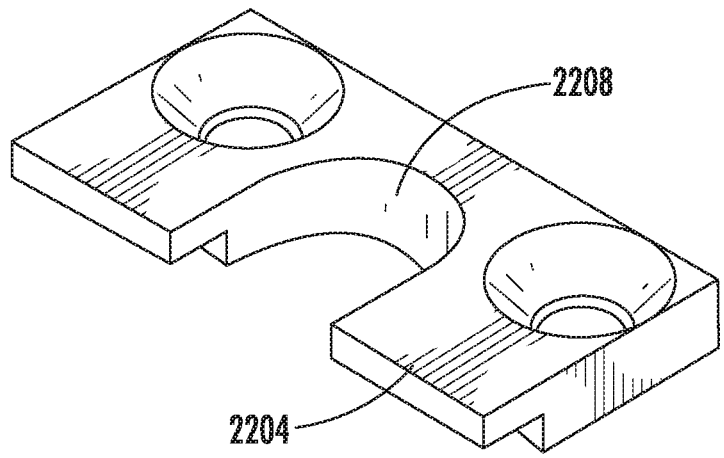
FIGS. 14A-14C are perspective and orthogonal views of certain embodiments of a deployed position portion of a plate assembly of the torque hinge of FIGS. 4A and 4B.
Figure 14B:
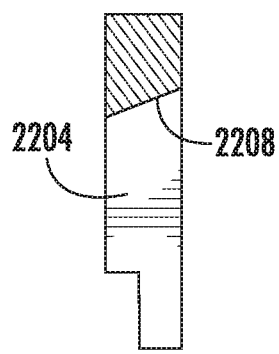
Figure 14C:
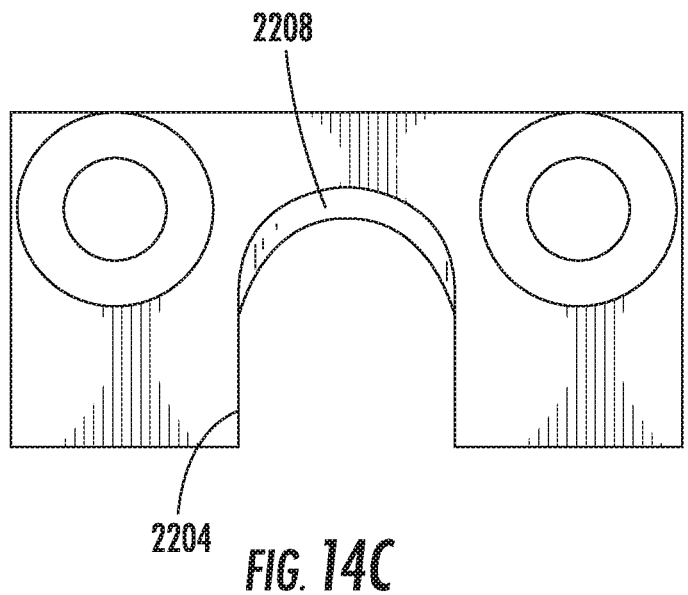

In other embodiments, FIGS. 14A-14C illustrate a deployed position portion 2204 having a recess 2208 contoured with a +22 degree deployed angle position. In these embodiments, the rotatable portion of the torque hinge 10 is angled away the structural support surface 3402 by 22 degrees short of the neutral positioned described with respect to FIGS. 13A-13D.

The person of ordinary skill in the relevant art will understand that these are but a few examples for deployed position portions 2204, and that any suitable angle may be used for the deployed position, which provides a suitable deployed position away the headrest 34, including but not limited to any value within the 0 to +22 degree range, or any value outside of this range.

The total range of movement between deployed and stowed positions may be adjusted by pairing differently shaped positive and negative plates together. For example, the total range of movement may be 27 degrees when a −5 degree stowed position portion 2202 is paired with a +22 degree deployed position portion 2204. In contrast, the range of motion may be 0 degrees when a 0 degree stowed position portion 2202 is paired with a 0 degree deployed position portion 2204. Thus, the actual angle of the stowed position may be adjusted, the actual angle of the deployed position may be adjusted, and the total range of motion may be adjusted by selecting the stowed position portion 2202 and deployed position portion 2204 that provide the desired results and positioning.

Furthermore, the portions 2202 and 2204 are configured to limit the end points over the range of motion of the rotatable portion of the torque hinge 10. The friction between the surface of the ball portion 1202 and the two rounded surfaces 1424, 1624 is designed to hold the rotatable portion of the torque hinge 10 at any suitable angle over the entire range of angled positions between the maximum deployed angle and the stowed angle limit. The torque hinge 10 will maintain the desired position until a force that is sufficient to overcome the frictional resistance between the ball portion 1202 and the two rounded surfaces 1424, 1624 is applied to the rotatable portion of the torque hinge 10, at which point the rotatable portion of the torque hinge 10 will rotate along the arc until the force applied is less than the frictional resistance between the ball portion 1202 and the two rounded surfaces 1424, 1624.

The plate assembly 22 may be formed of any suitable material have a sufficient hardness to withstand repeated use and pressure without bending or breaking. For example, suitable materials may have a hardness of at least 40-50 Shore A hardness. Suitable materials include but are not limited to aluminum, magnesium, stainless steel, titanium, carbon-fiber, composites, plastics, etc.

Figure 15A:
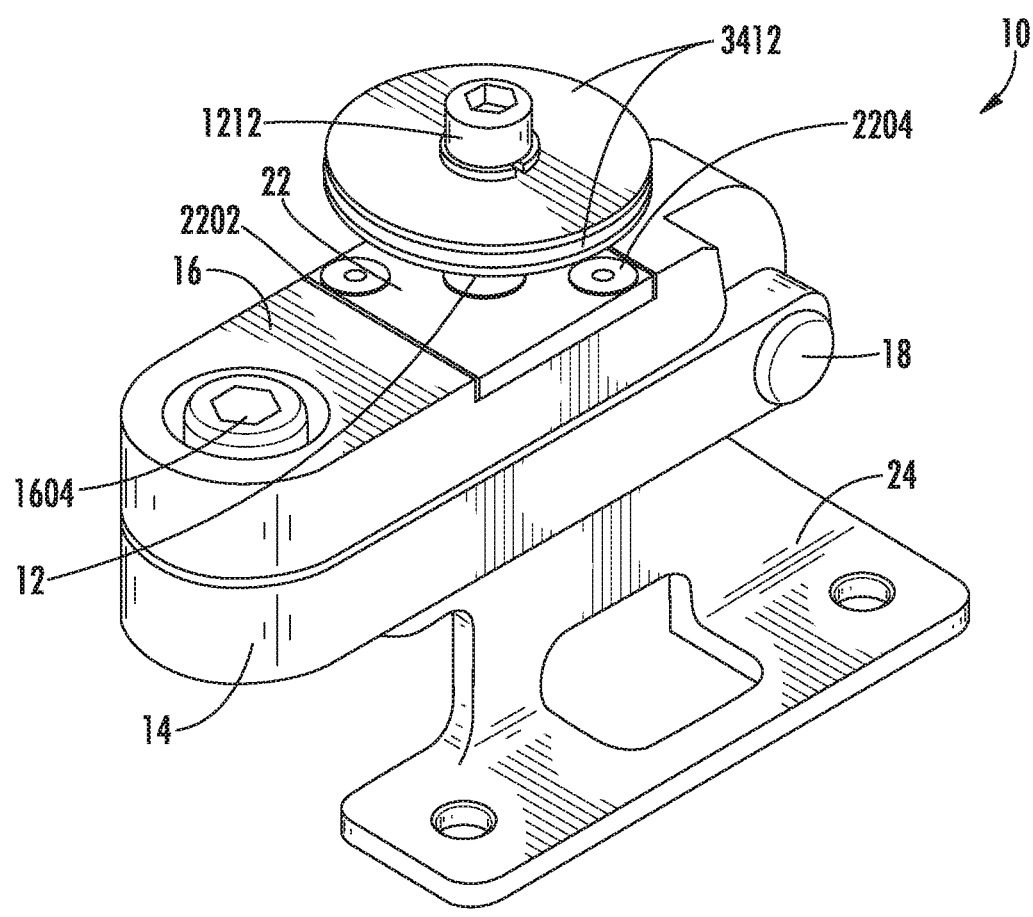
FIGS. 15A and 15B are assembled and exploded views, respectively, of the torque hinge of FIGS. 4A and 4B with an integral plate assembly, according to certain embodiments of the present invention.
Figure 15B:
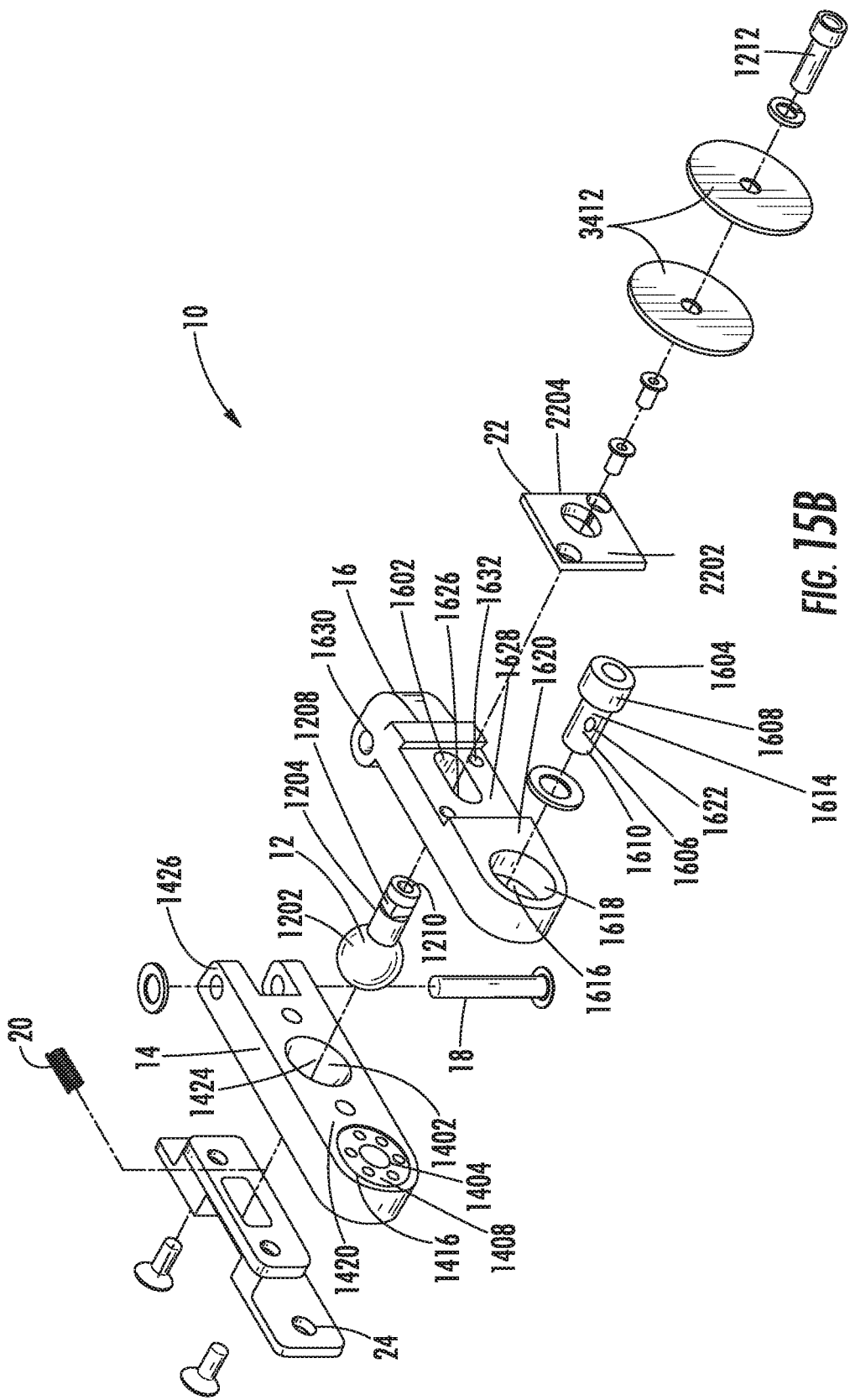

In some embodiments, as best illustrated in FIGS. 15A-15B, the stowed position portion 2202 and the deployed position portion 2204 may be integrally formed as a single plate.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A headrest comprising:
   a structural support surface comprising a front side and a rear side; and
   a torque hinge comprising
   a lower hinge assembly comprising an articulating base;
   an upper hinge assembly comprising a shaft receptacle;
   a ball joint comprising a ball portion connected to a shaft; and
   a plate assembly fitted over the shaft;
   wherein the ball portion is positioned between the articulating base and the shaft receptacle, and the shaft extends through an opening in the shaft receptacle;
   wherein the shaft is coupled to the rear side of the structural support surface by a fastener inserted from the front side of the structural support surface;
   wherein the plate assembly comprises a stowed position portion and a deployed position portion; and
   wherein the stowed position portion comprises a recess contoured to position the lower hinge assembly and the upper hinge assembly at a stowed angle.

2. The headrest of claim 1, wherein the articulating base and the shaft receptacle are coupled to one another by a connector comprising a stop screw.

3. The headrest of claim 1, wherein the shaft is coupled to the structural support surface, and the plate assembly limits a rotational arc of the lower hinge assembly and the upper hinge assembly relative to the shaft.

4. The headrest of claim 1, wherein the stowed angle ranges from −5 to +7 degrees relative to a neutral position in which the lower hinge assembly and the upper hinge assembly are positioned substantially perpendicular to the shaft.

5. The headrest of claim 1, wherein the deployed position portion comprises a recess contoured to position the lower hinge assembly and the upper hinge assembly at a deployed angle.

6. The headrest of claim 5, wherein the deployed angle ranges from 0 to +22 degrees relative to a neutral position in which the lower hinge assembly and the upper hinge assembly are positioned substantially perpendicular to the shaft.

7. A headrest comprising:
   a structural support surface; and
   a torque hinge comprising
   a rotatable portion;
   a ball joint comprising a ball portion connected to a shaft, wherein the ball portion is positioned within the rotatable portion; and
   a plate assembly fitted over the shaft;
   wherein the shaft is coupled to the structural support surface, and the plate assembly limits a rotational arc of the rotatable portion relative to the shaft; and
   wherein the rotatable portion comprises a lower hinge assembly comprising an articulating base and an upper hinge assembly comprising a shaft receptacle.

8. The headrest of claim 7, wherein the ball portion is positioned between the articulating base and the shaft receptacle.

9. The headrest of claim 8, wherein the articulating base and the shaft receptacle are coupled to one another by a connector comprising a stop screw.

10. The headrest of claim 7, wherein the plate assembly comprises a stowed position portion and a deployed position portion.

11. The headrest of claim 10, wherein the stowed position portion comprises a recess contoured to position the rotatable portion at a stowed angle.

12. The headrest of claim 11, wherein the stowed angle ranges from −5 to +7 degrees relative to a neutral position in which the rotatable portion is positioned substantially perpendicular to the shaft.

13. The headrest of claim 10, wherein the deployed position portion comprises a recess contoured to position the rotatable portion at a deployed angle.

14. The headrest of claim 13, wherein the deployed angle ranges from 0 to +22 degrees relative to a neutral position in which the rotatable portion is positioned substantially perpendicular to the shaft.

\* \* \* \* \*